US010709533B2

(12) United States Patent
Bloch et al.

(10) Patent No.: US 10,709,533 B2
(45) Date of Patent: *Jul. 14, 2020

(54) ORAL CARE IMPLEMENT AND HANDLE AND REFILL HEAD THEREOF

(71) Applicant: Colgate-Palmolive Company, New York, NY (US)

(72) Inventors: Brian Bloch, Hillsborough, NJ (US); Takahide Okai, Highland Park, NJ (US); John Gatzemeyer, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/838,796

(22) Filed: Dec. 12, 2017

(65) Prior Publication Data

US 2019/0174905 A1 Jun. 13, 2019

(51) Int. Cl.
| *A61C 17/22* | (2006.01) |
| *A46B 5/00* | (2006.01) |
| *A61C 17/34* | (2006.01) |
| *A61C 17/20* | (2006.01) |
| *A46B 9/04* | (2006.01) |

(52) U.S. Cl.
CPC .......... *A61C 17/222* (2013.01); *A46B 5/0095* (2013.01); *A46B 9/04* (2013.01); *A61C 17/225* (2013.01); *A61C 17/3481* (2013.01); *A46B 2200/1066* (2013.01); *A61C 17/20* (2013.01)

(58) Field of Classification Search
CPC ....... A61C 17/34; A61C 34/01; A61C 34/222; A61C 34/225; A61C 17/3481; A61C 17/222; A61C 17/225; A46B 5/0095; A46B 13/02; A46B 13/023

See application file for complete search history.

(56) References Cited

U.S. PATENT DOCUMENTS

| 3,088,148 A | 5/1963 | Moret |
| 3,937,235 A | 2/1976 | Broughton |
| 5,617,601 A | 4/1997 | McDougall |
| 5,617,602 A | 4/1997 | Okada |
| 5,697,117 A | 12/1997 | Craft |
| 6,161,244 A | 12/2000 | Jeannet et al. |

(Continued)

FOREIGN PATENT DOCUMENTS

| EP | 2478865 A1 | 7/2012 |
| WO | WO 2017095733 A1 | 11/2016 |

(Continued)

*Primary Examiner* — Laura C Guidotti (57) ABSTRACT

An oral care implement handle or a refill head therefor. The refill head may include a sleeve portion extending from a proximal end to a distal end, the sleeve portion having an inner surface that defines an internal cavity. The internal cavity may extend along a sleeve axis from an open bottom end at the proximal end of the sleeve portion to a closed top end, the internal cavity being configured to receive an attachment portion of a stem of an oral care implement handle. The internal cavity may have a proximal section adjacent the open bottom end and a distal section adjacent the closed top end. The distal section of the internal cavity may include a central portion located on the sleeve axis and at least one slot portion radially extending from the central portion.

19 Claims, 9 Drawing Sheets

(56) References Cited

U.S. PATENT DOCUMENTS

| | | |
|---|---|---|
| 6,836,917 B2 | 1/2005 | Blaustein et al. |
| 7,222,381 B2 | 5/2007 | Kraemer |
| 7,845,039 B2 | 12/2010 | Chan et al. |
| 8,453,285 B2 | 6/2013 | Dickie |
| 9,084,659 B2 | 7/2015 | Bovenkamp |
| 2008/0020351 A1 | 1/2008 | Hilscher et al. |
| 2008/0020352 A1 | 1/2008 | Hilscher et al. |
| 2011/0047729 A1 | 3/2011 | Iwahori et al. |
| 2014/0130274 A1 | 5/2014 | Fattori |
| 2014/0137346 A1 | 5/2014 | Fattori |
| 2014/0143963 A1 | 5/2014 | Fattori |
| 2014/0165312 A1 | 6/2014 | Fattori |
| 2014/0341636 A1 | 11/2014 | Fattori |
| 2015/0020325 A1 | 1/2015 | Yoshida et al. |
| 2017/0151044 A1 | 6/2017 | Okai |
| 2019/0175320 A1* | 6/2019 | Bloch ................. A46B 3/22 |

FOREIGN PATENT DOCUMENTS

| | | |
|---|---|---|
| WO | WO 2017160811 A1 | 9/2017 |
| WO | WO 2017160816 A1 | 9/2017 |

\* cited by examiner

ORAL CARE IMPLEMENT AND HANDLE AND REFILL HEAD THEREOF

BACKGROUND

Myriad implements and devices for maintaining oral health are known. For example, toothbrushes of both the manual and powered variety, floss, dentifrices, applicators, agents, and the like are all known to provide different benefits in the oral cavity. For oral care implements that include a handle and one or more replaceable oral care devices that can be repetitively coupled to and detached from the handle, there is a need to design a coupling or locking mechanism to ensure that the replaceable oral care device remains securely coupled to the handle during use. Furthermore, devices of this type may also include alignment features to ensure that the replaceable oral care device and handle are acceptably aligned during coupling. There remains a need for improvement in all of the aforementioned areas with regard to oral care implements including a need for a proprietary oral care implement handle to refill head connection mechanism.

BRIEF SUMMARY

The present invention is directed to an oral care implement handle or a refill head therefor. The oral care implement handle may include a gripping portion and a stem protruding from a shoulder of the gripping portion. The stem may include a post located at a distal end of the stem. The post may have a non-circular transverse profile. More specifically, the post may include a hub portion and a protuberance. The protuberance may protrude radially from a side surface of the hub portion, upward from the shoulder of the gripping portion, or both. The refill head may include a sleeve having an inner surface that defines an internal cavity for receiving the stem of the handle. The internal cavity may include a distal section having a central portion and at least one slot portion extending radially from the central portion. Thus, the internal cavity of the sleeve portion may have a profile configured to receive the stem of the oral care implement handle including the non-circular post thereof.

In one aspect, the invention may be an oral care implement handle comprising: a gripping portion extending from a proximal end to a distal end; a stem comprising an attachment portion protruding from a first transverse shoulder at the distal end of the gripping portion, the stem extending along a stem axis and configured to be detachably coupled to a replaceable oral care device, the attachment portion of the stem comprising: a second transverse shoulder axially spaced from the first transverse shoulder; and a post protruding from the second transverse shoulder, the post terminating in a closed distal end that forms a free end of the attachment portion of the stem, the post comprising a hub portion extending along the stem axis and at least one protuberance protruding either (1) radially from a side surface of the hub portion; and/or (2) upward from the second transverse shoulder; and a vibration generating device.

In another aspect, the invention may be an oral care implement handle comprising: a gripping portion extending from a proximal end to a distal end; a stem comprising an attachment portion protruding from the distal end of the gripping portion, the stem extending along a stem axis and configured to be detachably coupled to a replaceable oral care device, the attachment portion of the stem comprising a post terminating in a closed distal end that forms a free end of the attachment portion of the stem, the closed distal end of the post having a non-circular transverse profile.

In yet another aspect, the invention may be an oral care refill head comprising: a sleeve portion extending from a proximal end to a distal end, the sleeve portion comprising: an inner surface that defines an internal cavity; the internal cavity extending along a sleeve axis from an open bottom end at the proximal end of the sleeve portion and a closed top end, the internal cavity configured to receive an attachment portion of a stem of an oral care implement handle; the internal cavity comprising a proximal section adjacent the open bottom end and a distal section adjacent the closed top end; and the distal section of the internal cavity comprising a central portion located on the sleeve axis and at least one slot portion radially extending from the central portion.

In still another aspect, the invention may be an oral care refill head comprising: a sleeve portion extending from a proximal end to a distal end, the sleeve portion comprising: an inner surface that defines an internal cavity that extends along an axis, the internal cavity configured to receive an attachment portion of a stem of an oral care implement handle; and wherein a transverse cross-section of the internal cavity comprises a central portion and a plurality of slot portions radially extending from the central portion, the plurality of slot portions being circumferentially equi-spaced from one another.

In a further aspect, the invention may be an oral care implement comprising: a handle comprising: a gripping portion extending from a proximal end to a distal end, the distal end of the gripping portion forming a first transverse shoulder; a stem extending along a stem axis and comprising an attachment portion protruding from the first transverse shoulder that houses a vibration generating device, the attachment portion comprising: a second transverse shoulder axially spaced from the first transverse shoulder; and a post protruding from the second transverse shoulder, the post terminating in a closed distal end that forms a free end of the attachment portion of the stem, the post comprising a hub portion extending along the stem axis and at least one protuberance protruding either (1) radially from a side surface of the hub portion; and/or (2) upward from the second transverse shoulder, the at least one protuberance terminating in a side terminal surface; a refill head comprising: a sleeve portion extending from a proximal end to a distal end, the sleeve portion comprising an inner surface that defines an internal cavity; and wherein the refill head is detachably coupled to the stem of the handle such that the attachment portion of the handle is located within the internal cavity of the sleeve portion of the refill head and the side terminal surface of the at least one protuberance is in surface contact with the inner surface of the sleeve portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Figure 1:
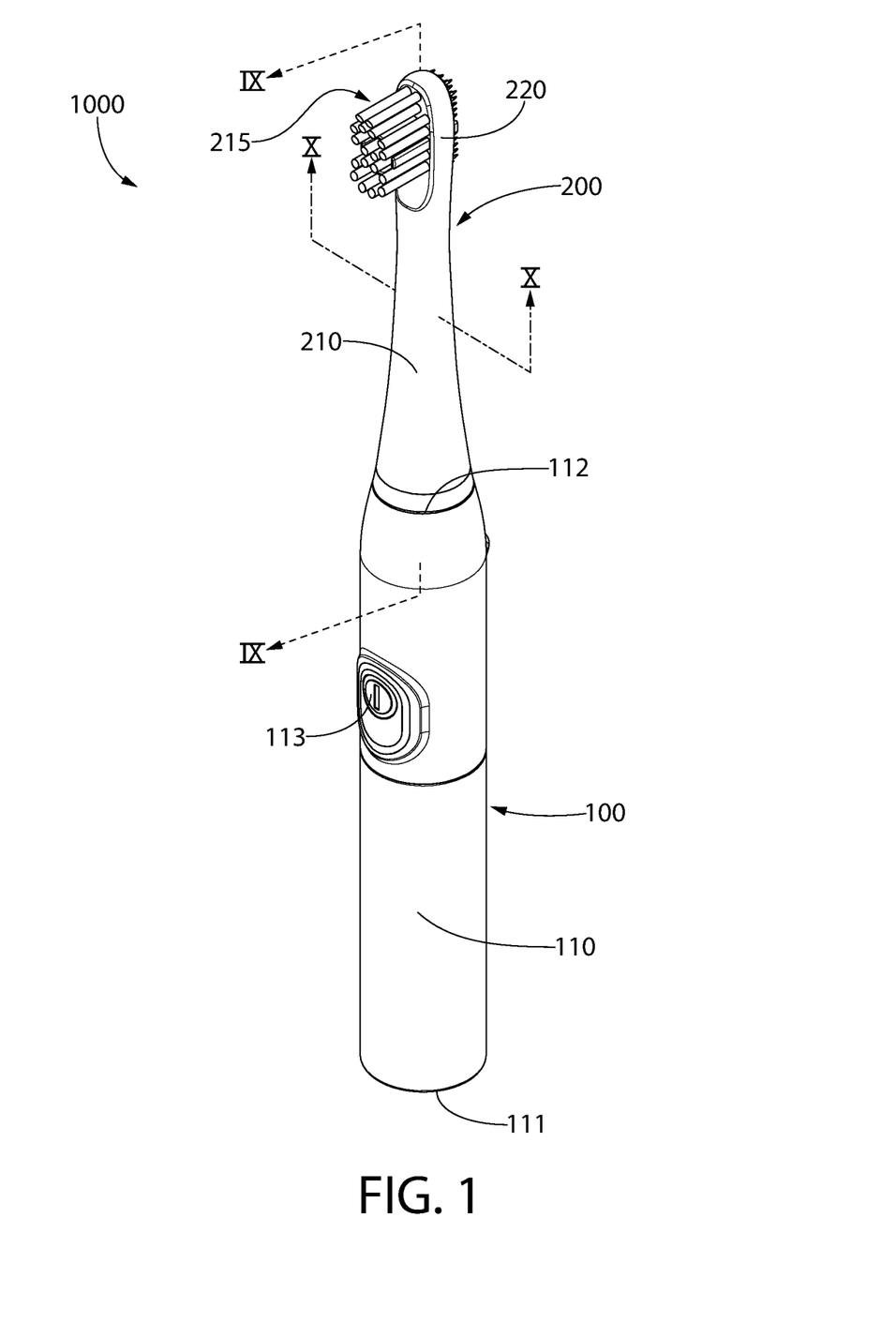
FIG. 1 is a front perspective view of an oral care implement having a refill head and a handle in accordance with an embodiment of the present invention.
Figure 2:
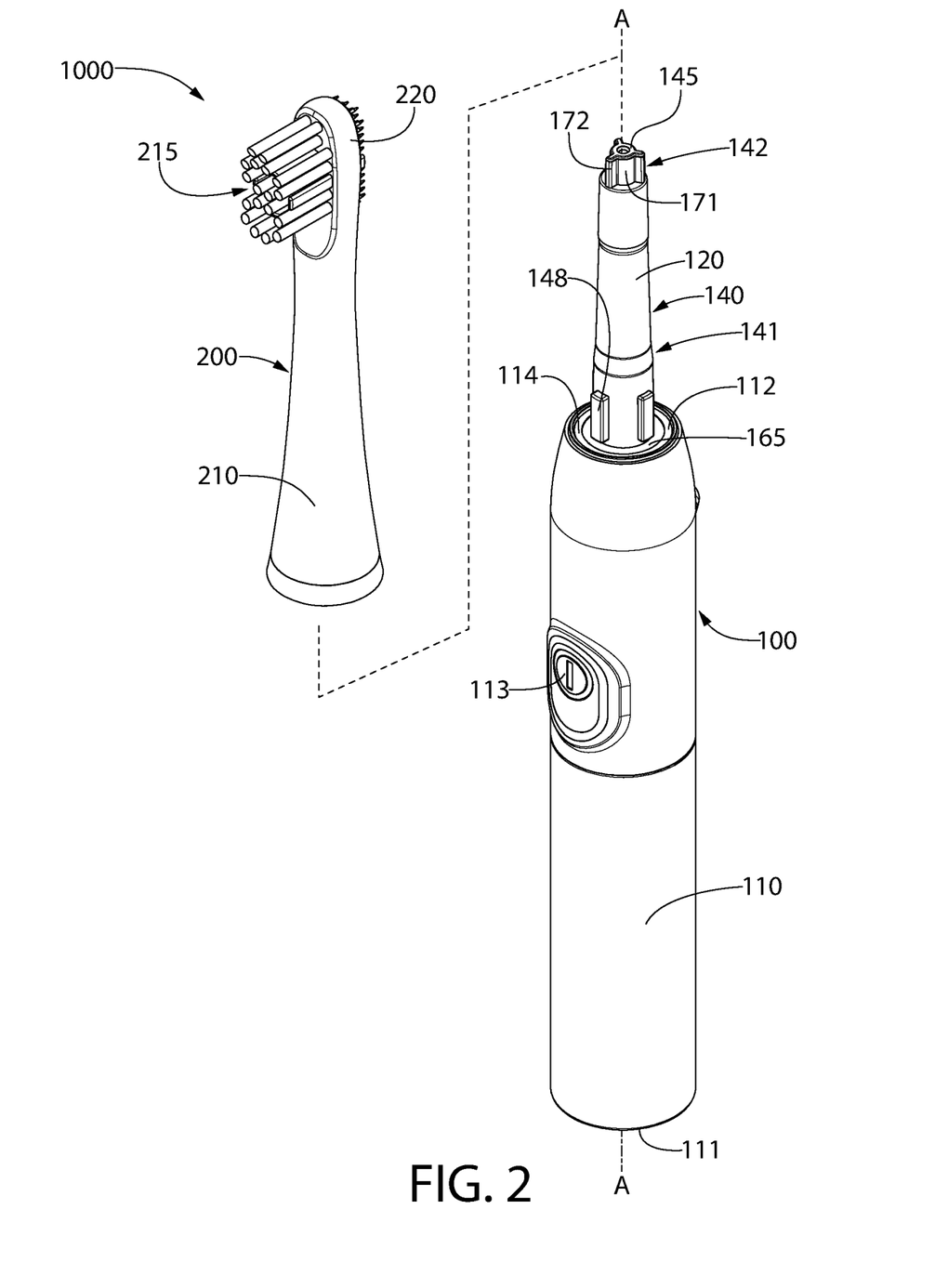
FIG. 2 is a front perspective view of the oral care implement of FIG. 1 illustrating the refill head detached from a handle.
Figure 3:
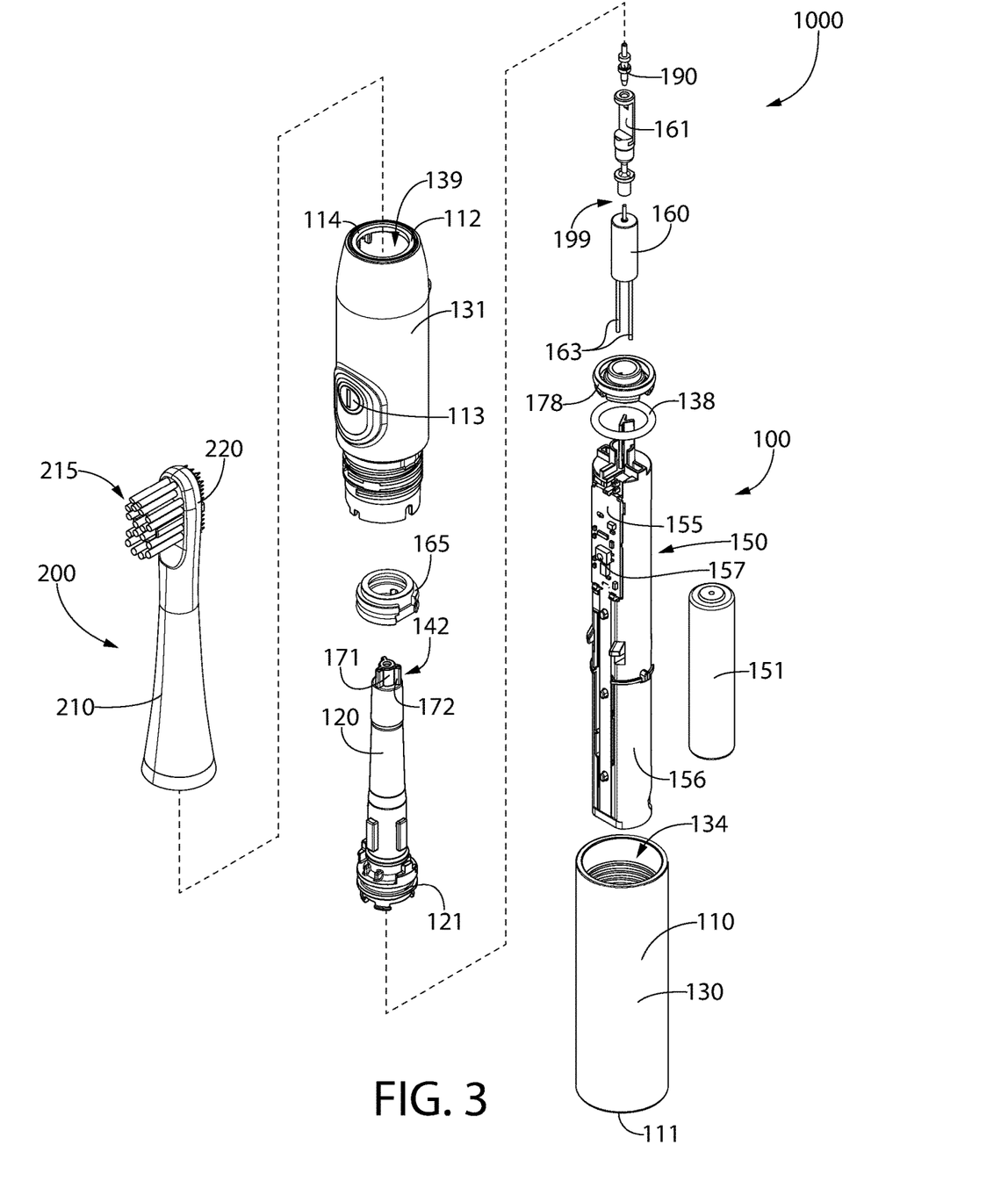
FIG. 3 is an exploded front perspective view of the oral care implement of FIG. 1.

Referring to FIGS. 1-3 concurrently, an oral care implement 1000 is illustrated in accordance with an embodiment of the present invention. The oral care implement 1000 generally comprises a handle 100 and a refill head 200. The refill head 200 is detachably coupled to the handle 100. Thus, the refill head 200 may be repetitively coupled to and detached from the handle 100 as desired. This enables the handle 100 to be kept and reused while the refill head 200 is replaced with a new refill head when the cleaning elements of the refill head 200 become worn. This is desirable because often the handle contains or otherwise houses the expensive electronic components of an oral care implement and the handle usually long outlasts the tooth cleaning elements. Thus, by permitting the refill head 200 to be detached from the handle 100 and replaced with another refill head, the same handle can be used with different refill heads 200, thereby prolonging the life of the oral care implement 1000.

In the exemplified embodiment, the oral care implement 1000 is a powered or electric toothbrush (including a vibration generating device that moves a bristle holder or vibrates the head or portions thereof). Of course, the invention is not to be so limited in all embodiments and in other embodiments the oral care implement 1000 may be a manual toothbrush, a tongue scraper, a gum and soft tissue cleanser, a water pick, an interdental device, a tooth polisher, a specially designed ansate implement having tooth engaging elements, or any other type of implement that is commonly used for oral care.

The handle 100 extends along a longitudinal axis A-A and comprises a gripping portion 110 extending from a proximal end 111 to a distal end 112 and a stem 120 that extends or protrudes from the distal end 112 of the gripping portion 111. The distal end 112 of the gripping portion 110 forms a first transverse shoulder 114 of the stem 120. In the exemplified embodiment, the stem 120 is not directly attached to the gripping portion 110, but rather it extends through an opening 139 in the distal end 112 of the gripping portion 111. Thus, stating that the stem 120 extends from the distal end 112 of the gripping portion 111 does not require a direct coupling between the stem 120 and the distal end 112 of the gripping portion 111, but merely requires that the stem 120 extends in the longitudinal direction A-A beyond the distal end 112 of the gripping portion 110. Of course, the stem 120 may be directly coupled to and extend directly from the distal end 112 of the gripping portion 110 in some embodiments. The first transverse shoulder 114 circumferentially surrounds the stem 120 as it protrudes form the distal end 112 of the gripping portion 110.

In the exemplified embodiment, the gripping portion 110 of the handle 100 comprises an actuator 113 on its outer surface that enables a user to power the oral care implement 1000 on and off. In the exemplified embodiment, the actuator 113 is located on a front surface of the gripping portion 110 of the handle 100. The actuator 113, when depressed, engages a switch that powers a motor 160 of the oral care implement 1000 and causes the motor 160, via its coupling to an eccentric 161, to create vibrations that enhance a user's cleaning experience. Thus, the actuator 113 is configured to activate and deactivate a vibration generating device 199 (which may comprise the motor 160, the eccentric 161, and a power source) that is housed within the handle 100, as described more fully below. The details of these electronic components will be described more fully herein below.

The refill head 200 comprises a sleeve portion 210 and a head portion 220. The sleeve portion 210 is the portion that fits over the stem 120 of the handle 100 to couple the refill head 200 to the handle 100. The head portion 220 has a plurality of tooth cleaning elements 215 extending therefrom for cleaning a user's oral cavity such as the teeth and gums. Additional details of the refill head 200 will be provided below with reference to FIGS. 6-8.

In the exemplified embodiment, the gripping portion 110 of the handle 100 comprises a first part 130 and a second part 131 that are detachably coupled together. The first and second parts 130, 131 may be detachably coupled together via mating screw threads, interference fit, boss/detent, or the like. Of course, it is possible in other embodiments for the gripping portion 110 to be formed from a single unitary component. However, the two-part gripping portion 110 may make it easier to assemble the various components of the oral care implement 1000 together. When coupled together, the first and second parts 130, 131 collectively define a handle cavity 134. An O-ring 138 (or other type of gasket) may be provided between the first and second parts 130, 131 of the gripping portion 110 to seal the interface of the first and second parts 130, 131 so that water and other fluids cannot pass into the handle cavity 134 during use of the oral care implement 1000 or otherwise.

An electronics component 150 is housed within the handle cavity 134. The electronics component 150 comprises a circuit board 155 comprising the electronic circuitry necessary for proper operation of the oral care implement 1000, including processor(s), memory device(s), switch(es) 157, resistors, capacitors, and the like. The electronics component 150 also comprises a chassis 156 that holds a power source 151, which is shown as a battery exploded away from the electronics component 150 in FIG. 3. Of course, more than one battery may be used. In the exemplified embodiment, the circuit board 155 is coupled to one side of the chassis 156 and the batteries are housed within a compartment located on the opposite side of the chassis 156. Of course, other arrangements are possible in other embodiments. Generally, the electronics component 150 is configured to be coupled to the motor 160 to control operation of the motor 160 such that when the switch 157 is on the motor 160 is operating and when the switch 57 is off the motor 160 is not operating. On/off of the switch 157 may be controlled via actuation of the actuator 113.

Figure 9:
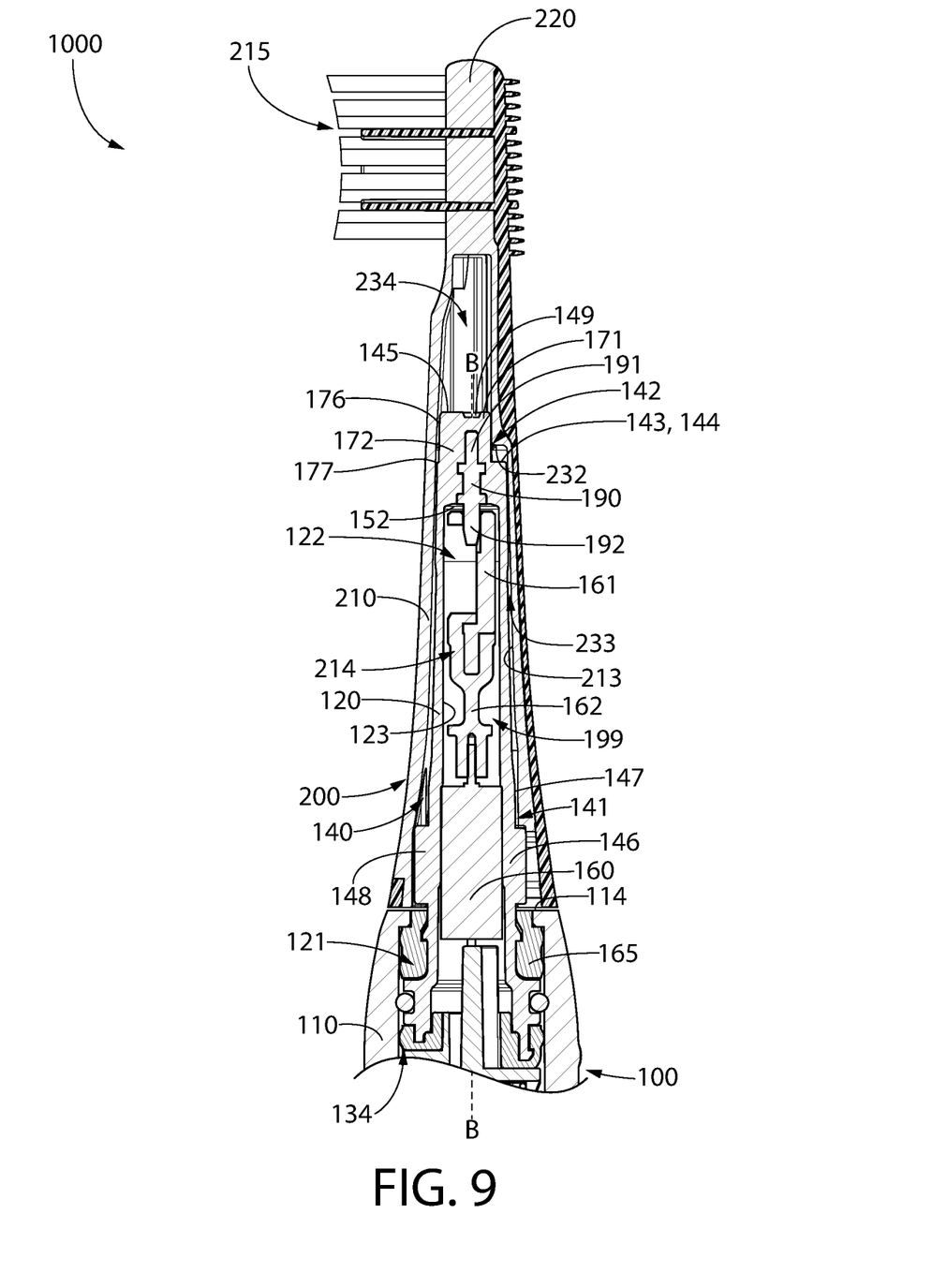
FIG. 9 is a cross-sectional view taken along line IX-IX of FIG. 1.

A gasket 165 is provided at the junction of the stem 120 and the gripping portion 110 to prevent the ingress of liquids at the location of the junction of those two components. The gasket 165 is coupled to the stem 120 so as to surround a lower portion 121 of the stem 120. Furthermore, the gasket 165 presses against the inner surface of the second component 131 of the gripping portion 110 to maintain the stem 120 in position without the stem 120 falling into the handle cavity 134. A portion of the gasket 165 may be visible when the handle 100 is fully assembled with the refill head 200 detached therefrom, as best illustrated in FIG. 2. The interaction of the gasket 165 with the stem 120 and the gripping portion 110 is best shown in FIG. 9. A second gasket 178 may be coupled to another portion of the lower portion 121 of the stem 120 and collectively the gasket 165 and the second gasket 178 operate to prevent the ingress of fluids. Of course, one or both of the gasket 165 and the second gasket 178 may be omitted in alternative embodiments.

Referring to FIGS. 3 and 9, the stem 120 comprises an inner surface 123 that defines an inner cavity 122 that houses the motor 160, the eccentric 161, a coupling member 162 that couples the motor 160 to the eccentric 161, and a shaft 190. The motor 160, the eccentric 161, and the power source 151 (or various other combinations of the components housed within the stem 120) may be referred to herein collectively as the vibration generating device 199 because these components are coupled together and operate collectively to impart vibrations to the head portion 220 and the tooth cleaning elements 215 of the refill head 200. The motor 160 is electrically coupled to the electronics component 150 and the power source 151 via conductive wires 163 to control operation of the motor 160. When the motor 160 is activated, the eccentric 161 is caused to rotate due to its coupling to the motor 160. Due to the off-center rotation of the eccentric 161 relative to a central axis of the motor 160, rotation of the eccentric 161 imparts vibrations to the head portion 220 of the refill head 200.

Referring to FIGS. 2, 4, 5, and 9 concurrently, the stem 120 of the handle 100 will be further described. The stem 120 extends along a stem axis B-B and is configured to be detachably coupled to the refill head 200 (or, more generically, to a replaceable oral care device as it need not be limited to being configured for coupling to the refill head 200 described herein specifically). Thus, the stem 120 can in actuality be coupled to any replaceable oral care device that is capable of receiving the stem 120 therein and being locked thereto, at least in a temporary sense, such that the oral care device remains coupled to the stem 120 during use of the oral care implement 1000.

The stem 120 comprises the lower portion 121 and an attachment portion 140. When the handle 100 is fully assembled, the lower portion 121 of the stem 120 is located within the cavity 134 of the gripping portion 110 and the attachment portion 140 of the stem 120 protrudes from the first transverse shoulder 114 at the distal end 112 of the gripping portion 110. As described more fully below, the refill head 200 receives the attachment portion 140 of the stem 120 when coupled thereto. As seen in FIG. 9, a portion of the lower portion 121 of the stem 120 is surrounded by the gasket 165 and the gasket 165 terminates at the first transverse shoulder 114 whereas the attachment portion 140 of the stem 120 extends beyond the first transverse shoulder 114.

Figure 4:
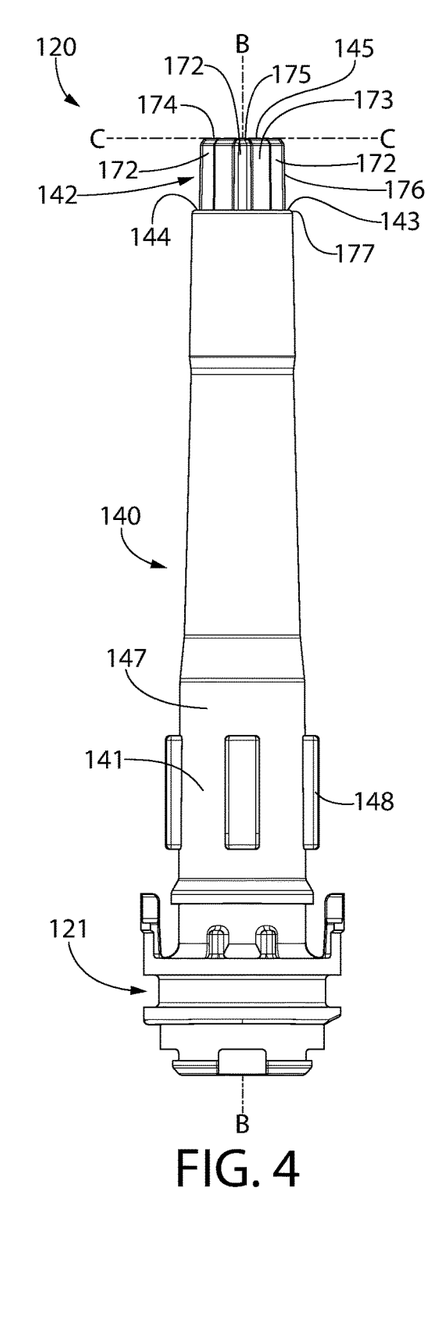
FIG. 4 if a front view of a stem of the handle of the oral care implement of FIG. 1.
Figure 5:
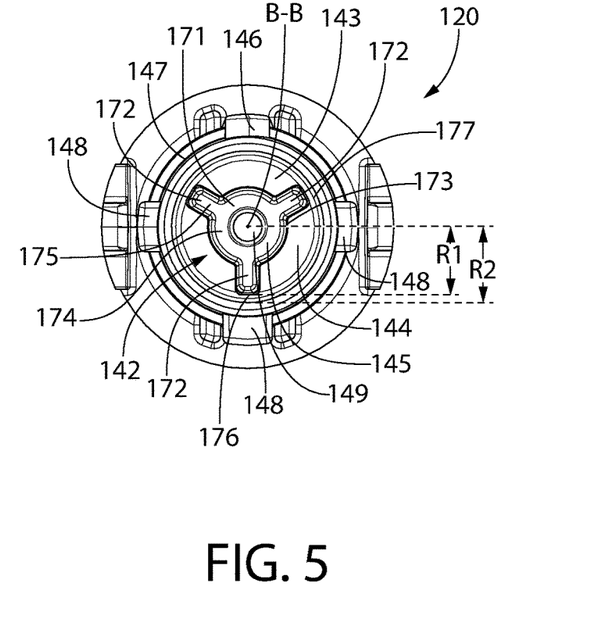
FIG. 5 is a top view of the stem of FIG. 4.

The attachment portion 140 of the stem 120 comprises a base portion 141 and a post 142. The base portion 141 protrudes from the first transverse shoulder 114 and terminates in a distal surface 143 that forms a second transverse shoulder 144 of the stem 120. The second transverse shoulder 144, which is formed by the distal end 143 of the base portion 141 of the attachment portion 140 of the stem 120, is axially spaced apart from the first transverse shoulder 114, which is formed by the distal end 112 of the gripping portion 110 of the handle 100. The post 142 protrudes from the second transverse shoulder 144 and terminates in a closed distal end 145 that forms a free end of the attachment portion 140 of the stem 120. In the exemplified embodiment, the closed distal end 145 of the post 142 comprises a depression 149 that is located on or aligned with the stem axis B-B.

In the exemplified embodiment, the stem 120 is an integrally formed structure that includes the lower portion 121 and the attachment portion 140 (with the attachment portion 140 comprising the base portion 141 and the post 142). Thus, the stem 120 may be a monolithic component formed from a rigid material, such as plastic or the like. In some embodiments the stem 120 is formed via injection molding, although this manufacturing technique is not required in all embodiments.

The base portion 141 comprises a locking feature 146 configured to mate with a locking feature of the refill head 200. In the exemplified embodiment, the locking feature 146 is a protuberance or boss that protrudes from an outer surface 147 of the base portion 141 and it is received within a recess, notch, or slot of the refill head 200. Furthermore, in the exemplified embodiment the base portion 141 also comprises one or more alignment protuberances 148 protruding from the outer surface 147 of the base portion 141. The size, shape, structure, depth, thickness, length, or the like of the locking feature 146 and/or the alignment protuberances 148 are not intended to be limiting of the present invention in all embodiments. Thus, various locking features 146 and alignment protuberances 148 may be used on the base portion 141 to ensure proper alignment between the refill head 200 and the handle 100 and to facilitate locking of the refill head 200 to the handle 100.

As noted above, the post 142 protrudes from the second transverse shoulder 144 at the distal end 143 of the base portion 141 of the stem 120 and terminates at the closed distal end 145. The post 142 has a smaller diameter (or maximum width measured transverse to the stem axis B-B) than the second transverse shoulder 144, and thus a portion of the second transverse shoulder 144 is exposed between an outermost surface/edge of the post 142 and an outer edge 177 of the second transverse shoulder 144. As best seen in FIG. 5, in the exemplified embodiment the closed distal end 145 of the post 142 of the stem 120 has a non-circular transverse profile. More specifically, in the exemplified embodiment the transverse profile of the closed distal end 145 of the post 142 is not circular, but rather it has a very specific shape to ensure that only a refill head having a similar shaped inner cavity can receive the stem 120, and more specifically the post 142 of the stem 120, therein.

In the exemplified embodiment, the post 142 comprises a hub portion 171 extending along the stem axis B-B and at least one protuberance 172 that extends from the hub portion 171. Specifically, the hub portion 171 has an outer surface (or a side surface) 173 and the at least one protuberance 172 extends radially from the outer surface 173 of the hub portion 171. The outer surface 173 of the hub portion 171 is the exposed portion of the hub portion 171 that extends between the second transverse shoulder 144 and the closed distal end 145 of the post 142. Of course, the invention is not to be so limited and it is also possible that the at least one protuberance 172 could protrude upwardly from the second transverse shoulder 144 of the stem 120 rather than protruding radially from the outer surface 173 of the hub portion 171. Thus, in such an embodiment the at least one protuberance 172 could be spaced apart from the outer surface 173 of the hub portion 171 and thus could extend from the second transverse shoulder 144 alongside of the hub portion 171. However, in the exemplified embodiment the at least one protuberance 172 protrudes both radially from the outer surface 173 of the hub portion 171 and upwardly from the second transverse shoulder 144. Thus, the at least one protuberance 172 is connected directly to both the hub portion 171 and the second transverse shoulder 144, although this is not required in all embodiments.

In the exemplified embodiment, the hub portion 171 has a circular cross-sectional shape. Furthermore, in the exemplified embodiment each of the protuberances 172 is a rib that protrudes radially from the outer surface 173 of the hub portion 171 and upward from the second transverse shoulder 114. In the exemplified embodiment, each of the protuberances 172 extends linearly from the hub portion 171 to a side terminal surface 176 thereof and thus the lateral side surfaces of the protuberances 172 that extend between the hub portion 171 and the side terminal surface 176 are linear. However, in other embodiments the protuberances 172 may instead be wavy or otherwise non-linear. In the exemplified embodiment, the portions of the outer surface 173 of the hub portion 171 located between the adjacent ones of the protuberances 172 are arcuate and more specifically convex. The protuberances 172 are elongated in a direction of the stem axis B-B, meaning that the protuberances 172 have a height measured in the direction of the stem axis B-B that is greater than a width of the protuberances 172 measured in a direction transverse to the stem axis B-B from the outer surface 173 of the hub portion 171 to the side terminal surface 176 of the protuberance In the exemplified embodiment, there are a plurality (i.e., three) of the protuberances 172 extending radially from the hub portion 171 in a spaced apart manner. Of course, more or less than three of the protuberances 172 may be used in other embodiments. In the exemplified embodiment, the protuberances 172 are circumferentially arranged about the hub portion 171 in a spaced apart manner relative to one another. Thus, portions of the outer surface 173 of the hub portion 171 that are located between the protuberances 172 are exposed. Although not required in all embodiments, in the exemplified embodiment the plurality of protuberances 172 are arranged in an equi-spaced manner relative to one another. Thus, in the exemplified embodiment because there are three of the protuberances 172, they are spaced apart by approximately 120°. In the exemplified embodiment, no two protuberances 172 are located 180° apart from one another. In certain embodiments, the circumferential distance between any two of the protuberances 172 is less than 150°, more specifically less than 140°, more specifically less than 130°, and still more specifically 120° or less. Thus, there is no plane that comprises the stem axis B-B that intersects the side terminal surfaces 176 of two or the protuberances 172.

As best seen in FIG. 2, in the exemplified embodiment at least one of the protuberances 172 faces the same direction as the actuator 113. Thus, the actuator 113 is located on the front surface of the gripping portion 110 of the handle 100 and at least one of the protuberances 172 extends from the hub portion 171 in the direction of the front surface of the gripping portion 110. Of course, the various protuberances 172 could be positioned at any circumferential location along the hub portion 171 in other embodiments such that each of the protuberances 172 may be located at any desired position along the hub portion 171.

As noted above, in certain embodiments the closed distal end 145 of the post 142 comprises a non-circular transverse profile. In that regard, the hub portion 171 of the post 142 forms a circular central region of the post 142 and each of one or more protuberances 172 forms an arm region of the post 142 that extends radially outward from the circular central region. It is this combination of the circular central region and the one or more arms that forms the non-circular transverse profile of the post 142.

In the exemplified embodiment, the hub portion 171 and each of the protuberances 172 extend the same height from the second transverse shoulder 144, measured in the direction of the stem axis B-B. Thus, the hub portion 171 has an upper terminal surface 174 and each of the protuberances 172 has an upper terminal surface 175. The upper terminal surfaces 174, 175 of the hub portion 171 and the protuberances 172 collectively define the free end of the attachment portion 140 of the stem 120. The upper terminal surfaces 174, 175 of the hub portion 171 and the protuberances 172 are aligned on a plane C-C that is orthogonal to the stem axis B-B. In the exemplified embodiment, the plane C-C is perpendicular to the stem axis B-B. Thus, in the exemplified embodiment the protuberances 172 are exactly the same height as the hub portion 171 in that both extend from the distal end 143 of the base portion 141 to the free end of the attachment portion 140. Of course, this is not required in all embodiments and the protuberances 172 could be taller or shorter than the hub portion 171 in alternative embodiments.

As noted above, each of the protuberances 172 extends from the hub portion 171 to the side terminal surface 176 of the protuberance 172. The side terminal surface 176 of each of the protuberances 172 is spaced a first radial distance R1 from the stem axis B-B. Furthermore, the outer edge 177 of the second transverse shoulder 144 is spaced a second radial distance R2 from the stem axis B-B. In the exemplified embodiment, the second radial distance R2 is greater than the first radial distance R1. Thus, none of the protuberances 172 extend all the way to the outer edge 177 of the second transverse shoulder 144. Rather, in the exemplified embodiment a portion of the second transverse shoulder 144 extends between the side terminal surface 716 of each of the protuberances 172 and the outer edge 177 of the second transverse shoulder 144. Of course, in alternative embodiments the protuberances 172 could extend all the way to the outer edge 177 of the second transverse shoulder 144 so that the first and second radial distances R1, R2 are equal, or the protuberances 172 could extend beyond the outer edge 177 of the second transverse shoulder 144 so that first radial distance R1 is greater than the second radial distance R2.

Referring to FIG. 9, as noted above the stem 120 houses the motor 160, the eccentric 161, and the coupling member 162 within the inner cavity 122 of the stem 120. Furthermore, in the exemplified embodiment a shaft 190 that supports the eccentric 161 is partially embedded within an upper portion of the stem 120. Specifically, the shaft 190 comprises a first portion 191 that is embedded within the upper portion of the stem 120 and a second portion 192 that protrudes from an upper wall 152 of the inner cavity 122 and extends into the inner cavity 122. Specifically, the first portion 191 of the shaft 190 extends into the hub portion 171 of the post 142 and the second portion 192 of the shaft 190 extends into the inner cavity 122 of the stem 120 to support the eccentric 161.

The eccentric 161 is positioned within the cavity 122 so that it is in direct contact with the second portion 192 of the shaft 190. Thus, as the eccentric 161 rotates, vibrations are transmitted from the eccentric 161 to the shaft 190. Having the first portion 191 of the shaft 190 extend into the hub portion 171 of the post 142 facilitates transmitting the vibrations to the head portion 220 of the refill head 200. Portions of the stem 120, and more specifically the post 142, may be in surface contact with the inner surface 123 of the sleeve portion 210 of the refill head 200 to ensure acceptable transmission of the vibrations from the eccentric 161 to the head portion 220.

Referring to FIGS. 1 and 6-8 concurrently, the refill head 200 will be described in detail. The refill head 200 comprises the sleeve portion 210 and the head portion 220 that is coupled to the sleeve portion 210. The sleeve and head portions 210, 220 may be integrally formed as a single unitary structure. The sleeve and head portions 210, 220 may comprise a base or body portion formed of a hard plastic material such as polypropylene or the like and an elastomeric material may be overmolded onto the base or body portion. In the exemplified embodiment, the refill head 200 comprises the plurality of tooth cleaning elements 215 that extend from a front surface 221 of the head portion 220 and a soft tissue cleaner 216 is located on a rear surface 222 of the head portion 220. The soft tissue cleaner 216 comprises a pad portion 295 and a plurality of protuberances or nubs 296 protruding from the pad portion 295. The soft tissue cleaner 216 may be formed of a resilient material such as a thermoplastic elastomer. The elastomer material may be filled on the body portion in a channel extending substantially parallel to the sleeve axis D-D as shown in FIGS. 7-10. Of course, the soft tissue cleaner 216 could be omitted in some alternative embodiments.

The tooth cleaning elements 215 are illustrated on the head with a specific arrangement and pattern. Specifically, the tooth cleaning elements 215 include a combination of filament bristles 217 and elastomeric cleaning elements 218 that collectively form a bristle field. The elastomeric cleaning elements 218 may be formed integrally with the soft tissue cleaner 216 when both of these elements are included, as they are in the exemplified embodiment.

In certain embodiments, the exact structure, pattern, orientation, and material of the tooth cleaning elements 215 are not to be limiting of the present invention. Thus, the term "tooth cleaning elements" may be used herein in a generic sense to refer to any structure that can be used to clean, polish or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, spiral bristles, rubber bristles, elastomeric protrusions, flexible polymer protrusions, combinations thereof, and/or structures containing such materials or combinations. Suitable elastomeric materials include any biocompatible resilient material suitable for uses in an oral hygiene apparatus. To provide optimum comfort as well as cleaning benefits, the elastomeric material of the tooth or soft tissue engaging elements has a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

The tooth cleaning elements 215 of the present invention can be connected to the head portion 220 in any manner known in the art. For example, staples/anchors, in-mold tufting (IMT) or anchor free tufting (AFT) could be used to mount the cleaning elements/tooth engaging elements. In certain embodiments, the invention can be practiced with various combinations of stapled, IMT or AFT bristles. In the exemplified embodiment, the filament bristles 217 are secured to the head portion 220 using staples/anchors and the elastomeric cleaning elements 218 are integrally formed with the soft tissue cleaner 216 through one or more passageways 219 extending through the head portion 220 from the front surface 221 to the rear surface 222 thereof.

Figure 6:
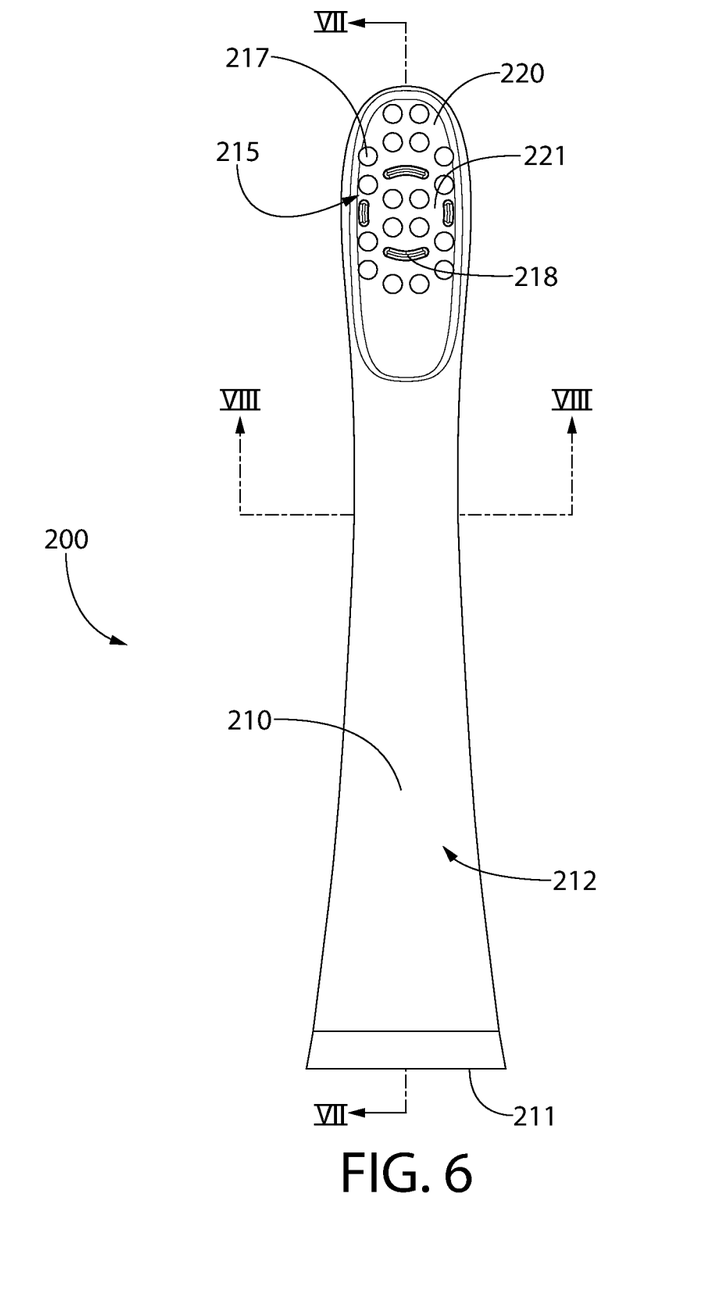
FIG. 6 is a front view of the refill head of FIG. 1.
Figure 7:
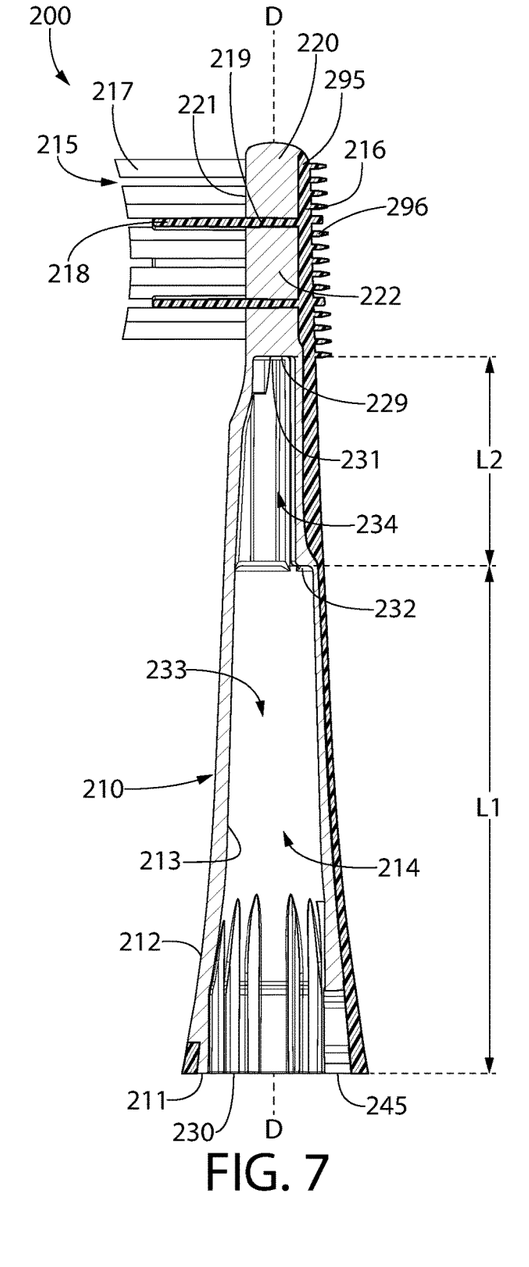
FIG. 7 is a cross-sectional view taken along line VII-VII of FIG. 6.
Figure 8:
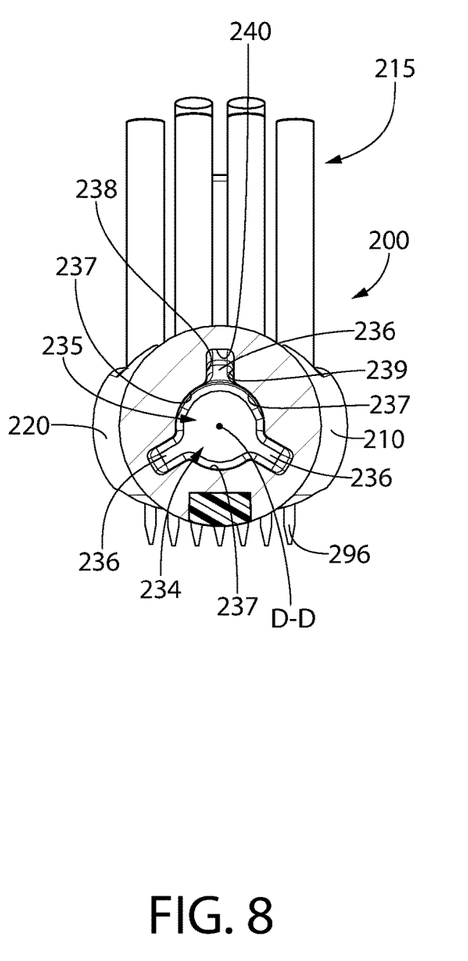
FIG. 8 is a cross-sectional view taken along line VIII-VIII of FIG. 6.

The sleeve portion 210 of the refill head 200 extends from a proximal end 211 to the head portion 220. Furthermore, the sleeve portion 210 of the refill head 200 comprises an outer surface 212 and an opposite inner surface 213, the inner surface 213 defining an internal cavity 214. An opening 245 is formed into the proximal end 211 of the sleeve portion 210 that forms a passageway into the internal cavity 214. The internal cavity 214 is sized and shaped to receive the attachment portion 140 of the stem 120 of the handle 100 when the refill head 200 is coupled to the handle 100.

The internal cavity 214 of the sleeve portion 210 extends along a sleeve axis D-D from an open bottom end 230 (formed by the opening 245) at the proximal end 211 of the sleeve portion 210 to a closed top end 231 that is formed by an upper wall 229 of the sleeve portion 210. The inner surface 213 of the sleeve portion 210 comprises a sleeve shoulder 232 that is axially spaced from the proximal end 211 of the sleeve portion 210. The sleeve shoulder 232 faces the proximal end 211 of the sleeve portion 210.

The internal cavity 214 of the sleeve portion 210 comprises a proximal section 233 adjacent to the open bottom end 230 of the internal cavity 214 and a distal section 234 that is adjacent to the closed top end 231 of the internal cavity 214. More specifically, the proximal section 233 of the internal cavity 214 extends from the open bottom end 230 of the internal cavity 214 to the sleeve shoulder 232 and the distal section 234 of the internal cavity 214 extends from the sleeve shoulder 232 to the closed top end 231 of the internal cavity 214 (i.e., to the upper wall 229 of the sleeve portion 210). The proximal section 233 of the internal cavity 214 has a first axial length L1 measured in the direction of the sleeve axis D-D and the distal section 234 of the internal cavity 214 has a second axial length L2 measured in the direction of the sleeve axis D-D. In the exemplified embodiment, the first axial length L1 is greater than the second axial length L2 (a ratio of L1:L2 is between 2.0:1 and 3.0:1, more specifically 2.2:1 and 2.8:1, and still more specifically 2.4:1 and 2.5:1, although the invention should not be so limited in all embodiments). Furthermore, in the exemplified embodiment the proximal section 233 of the internal cavity 214 tapers with distance from the proximal end 211 of the sleeve portion 210 towards the sleeve shoulder 232. Nonetheless, due to the sleeve shoulder 232 being the dividing line between the proximal and distal sections 233, 234 of the internal cavity 214, the proximal section 233 has a minimum diameter (or width measured transverse to the sleeve axis D-D) that is greater than a maximum diameter (or width measured transverse to the sleeve axis D-D) of the distal section 234.

Referring specifically to FIGS. 7 and 8, the distal section 234 of the internal cavity 214 will be further described. FIG. 8 illustrates a cross-section taken through the distal section 234 of the internal cavity 214 and it reveals that the distal section 234 of the internal cavity 214 comprises a central portion 235 located on the sleeve axis D-D and at least one slot portion 236 radially extending from the central portion 235. In the exemplified embodiment, there are three of the slot portions 236, although more or less than three slot portions 236 may be included in other embodiments. The slot portions 236 are circumferentially arranged about the central portion 235 in a spaced-apart manner from one another. In the exemplified embodiment the number of slot portions 236 matches the number of protuberances 172 of the post 142 of the attachment portion 140 of the stem 120, as described more fully below with reference to FIG. 10. Each of the slot portions 236 has an open lower end formed into the sleeve shoulder 232 and terminates at an upper surface. Furthermore, in the exemplified embodiment each of the slot portions 236 of the distal section 234 of the internal cavity 214 comprises a substantially constant transverse cross-sectional area.

The central portion 235 of the distal section 234 of the internal cavity 214 is defined by a plurality of arcuate sidewalls 237. Adjacent ones of the arcuate sidewalls 237 are separated by one of the plurality of slot portions 236. Furthermore, each of the slot portions 236 is defined by first and second sidewalls 238, 239 that extend radially outward from the central portion 235 and terminate in an end wall surface 240. Thus, each of the first and second sidewalls 238, 239 extend from one of the arcuate sidewalls 237 to the end wall surface 240. In the exemplified embodiment, the central portion 235 is circular and the slot portions 236 are rectangular, although the invention need not be limited to these specific shapes in all embodiments. As seen in FIG. 8, in the exemplified embodiment one of the slot portions 236 extends radially in a first direction from the sleeve axis D-D, and at least one of the tooth cleaning elements 215 extends from the head portion 220 in the first direction. Thus, one of the slot portions 236 extends in the same direction as one or more of the tooth cleaning elements 215. Also as seen in FIG. 8, the first and third arcuate sidewalls have a first thickness measured from the inner surface to the outer surface and the second arcuate sidewall has a second thickness measured from the inner surface to the outer surface, the first thickness being greater than the second thickness. Also, the plurality of arcuate sidewalls have a first arcuate width and the plurality of slot portions have a second arcuate width, the first arcuate width being greater than the second arcuate width.

Figure 10:
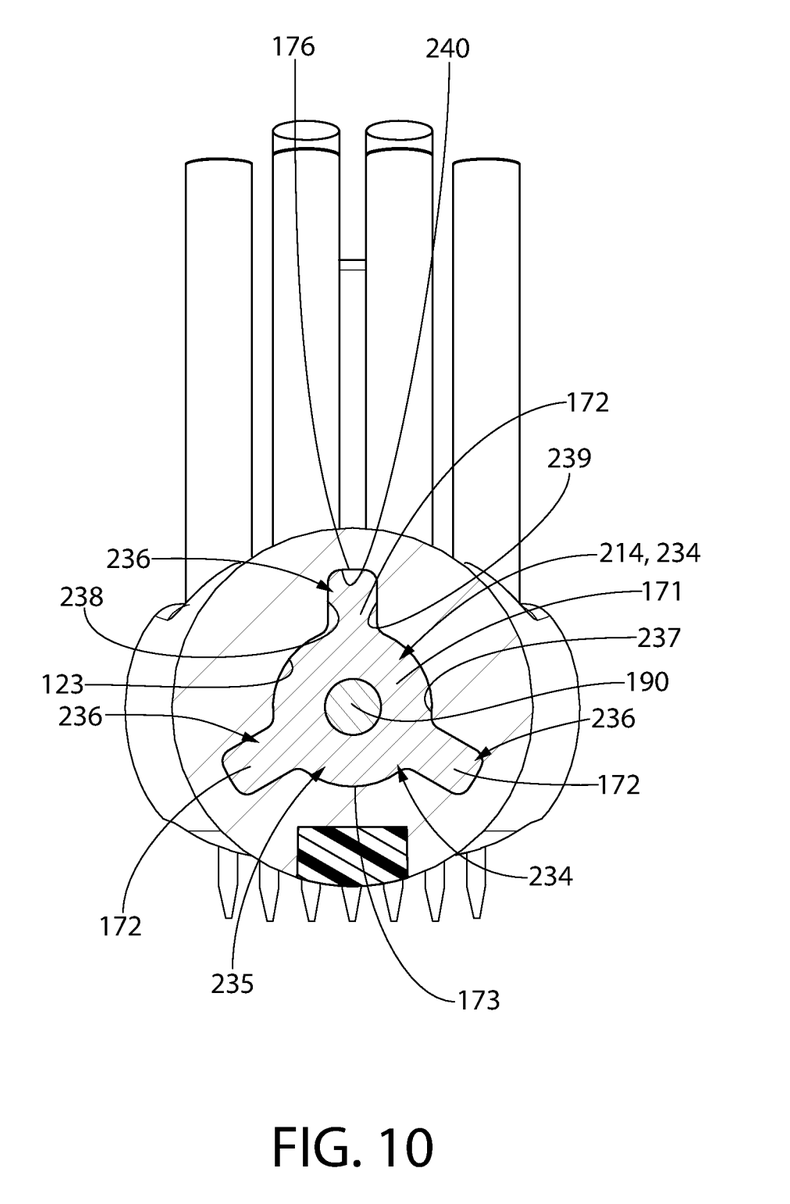
FIG. 10 is a cross-sectional view taken along line X-X of FIG. 1.

Referring to FIGS. 9 and 10, cross-sections of the assembled oral care implement 1000 are illustrated whereby the refill head 200 is coupled to the stem 120 of the handle 100. As can be seen, the attachment portion 140 of the stem 120 is located within the internal cavity 214 of the refill head 200 such that the post 142 is located within the distal section 234 of the internal cavity 214. More specifically, the hub portion 171 of the post 142 is located within the central portion 235 of the distal section 234 of the internal cavity 214 and the protuberances 172 of the post 142 are located within the slot portions 236 of the distal section 234 of the internal cavity 214. In this particular embodiment, the exposed portions of the outer surface 173 of the hub portion 171 are in contact with the arcuate sidewall surfaces 237 defining the central portion 235 of the distal section 234 of the internal cavity 214 and the side terminal surfaces 176 of the protuberances 172 are in contact with the end wall surfaces 240 of the slot portions 236 of the distal section 234 of the internal cavity 214.

Thus, in this embodiment there is a reasonably snug fit between the post 142 and the distal section 234 of the internal cavity 214. This ensures that vibrations generated by the vibration generating device 199 are transmitted to the refill head 200 so that they can benefit a user during toothbrushing. Of course, minor gaps may be present for tolerance to ensure that the post 142 of the stem 120 can fit within the distal section 234 of the internal cavity 214. However, such gaps when included should be quite small to ensure that vibrations are transmitted to the head portion 220 of the refill head 200 as described herein.

Figure 11:
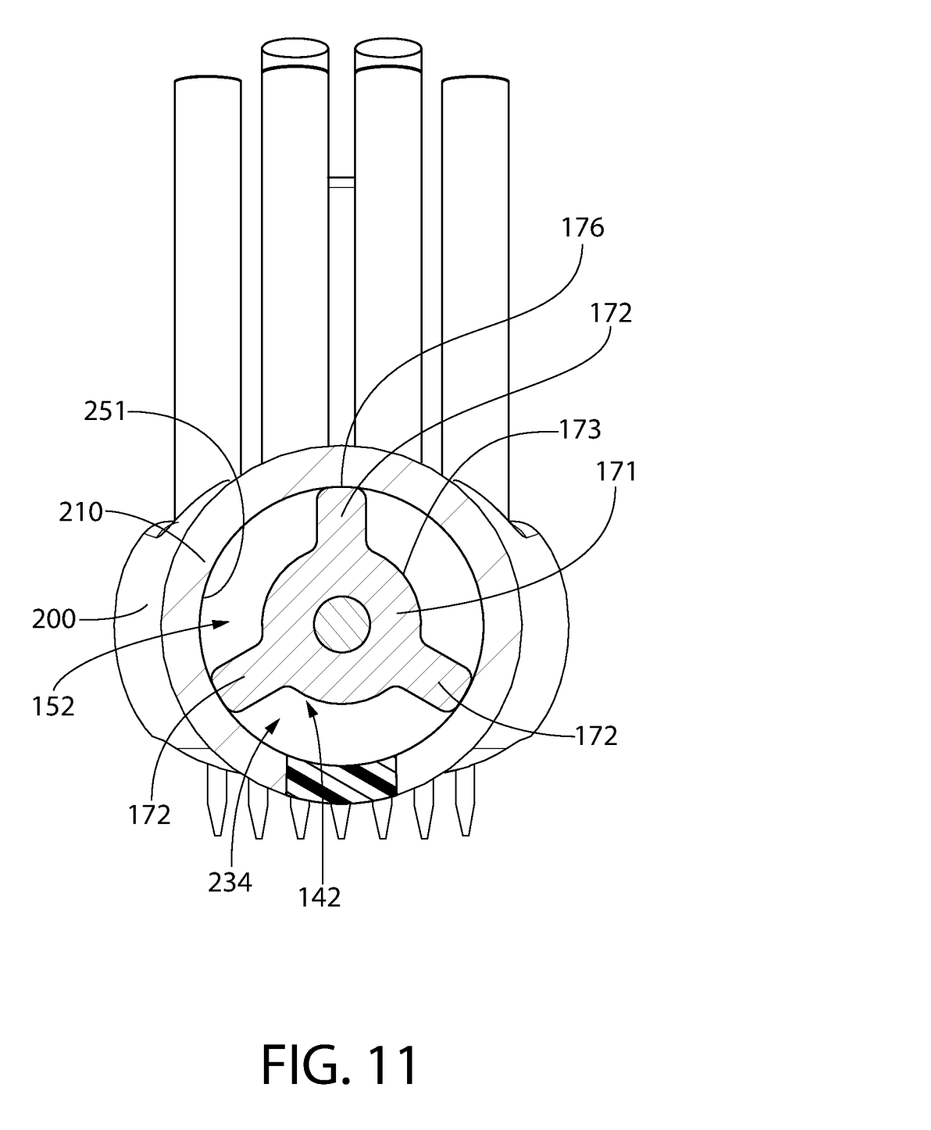
FIG. 11 is a cross-sectional view taken along line X-X of FIG. 1 in accordance with an alternative embodiment of the present invention.

FIG. 11 illustrates a cross-sectional view similar to FIG. 10 except in accordance with an alternative embodiment. Specifically, in this embodiment the post 142 has the exact same structure as previously described in that it comprises a hub portion 171 and a plurality of protuberances 172 protruding from the outer surface 173 of the hub portion 172. What is difference in this embodiment is the shape/configuration of the distal section 234 of the internal cavity 214 of the sleeve portion 210 of the refill head 200. Specifically, the distal section 234 of the internal cavity 214 in this embodiment does not include a central portion and slot portions extending radially therefrom. Rather, the distal section 234 of the internal cavity 214 is defined by an inner surface 251 which in the exemplified embodiment is a continuous, annular surface in the shape of a circle. Thus, there are no sidewalls and end wall surfaces, but rather a singular inner surface 251 defines the entirety of the distal section 234 of the internal cavity 214.

Thus, when fully assembled, the outer surface 173 of the hub portion 171 of the post 142 is spaced apart from the inner surface 251 of the distal section 234 of the internal cavity 214 of the sleeve portion 210 of the refill head 200 while the side terminal surfaces 176 of the protuberance 172 of the post 142 are in surface contact with the inner surface 251 of the distal section 234 of the internal cavity 214 of the sleeve portion 210 of the refill head 200. Thus, there are several air gaps 152 that remain that are bounded by adjacent protuberances 172, a portion of the inner surface 251 of the internal cavity 214, and a portion of the outer surface 173 of the hub portion 171. Because there are three protuberances 172 in the exemplified embodiment, there are also three air gaps 152, although more or less air gaps will be included based on the number of protuberances 172.

Thus, in this embodiment there is conformal surface contact between the side terminal surfaces 176 of the protuberances 172 and the inner surface 251 of the internal cavity 214, but there is no surface contact between the outer surface 173 of the hub portion 171 and the inner surface 251 of the internal cavity 214. Vibrations generated by the vibration generating device 199 may still be transmitted through the post 142 to the refill head 200 via the contact between the protuberances 172 and the inner surface 251 of the internal cavity 214.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care refill head comprising:
    a sleeve portion extending from a proximal end to a distal end, the sleeve portion comprising:
        a body portion having an outer surface and an inner surface that defines an internal cavity, the inner surface opposite the outer surface;
        the internal cavity extending along a sleeve axis from an open bottom end at the proximal end of the sleeve portion to a closed top end, the internal cavity configured to receive an attachment portion of a stem of an oral care implement handle;
        the internal cavity comprising a proximal section adjacent the open bottom end and a distal section adjacent the closed top end; and
        the distal section of the internal cavity comprising a central portion located on the sleeve axis and a plurality of slot portions radially extending from the central portion, the plurality of slot portions comprising a first slot portion, a second slot portion, and a third slot portion;
    a plurality of arcuate sidewalls extending between the plurality of slot portions and defining the central portion of the distal section of the internal cavity, a first arcuate sidewall between the first and second slot portions, a second arcuate sidewall between the second and third slot portions, and a third arcuate sidewall between the third and first slot portions;
    wherein the first and third arcuate sidewalls have a first thickness measured from the inner surface to the outer surface and the second arcuate sidewall has a second thickness measured from the inner surface to the outer surface, the first thickness being greater than the second thickness.

2. The oral care device according to claim 1 wherein the inner surface of the sleeve portion comprises a sleeve shoulder axially spaced from proximal end of the sleeve portion, the at least one slot of the distal section of the internal cavity having an open lower end in the sleeve shoulder.

3. The oral care device according to claim 2 wherein the proximal section of the internal cavity extends from the proximal end of the sleeve portion to the sleeve shoulder and has a first axial length, the distal section of the internal cavity extending from the sleeve shoulder to the closed top end of the internal cavity and having a second axial length, the first axial length being greater than the second axial length.

4. The oral care device according to claim 1 wherein the plurality of arcuate sidewalls have a first arcuate width and the plurality of slot portions have a second arcuate width, the first arcuate width being greater than the second arcuate width.

5. The oral care device according to claim 1 wherein each of the plurality of slot portions is defined by first and second sidewalls and an end wall surface, the first and second sidewalls being parallel; and wherein the first and second sidewalls are joined to the end wall surface by a radius.

6. The oral care device according to claim 5 wherein the plurality of arcuate sidewalls and the end wall surface are concentric.

7. The oral care device according to claim 1 wherein the first slot portion of the distal section of the internal cavity radially extends in a first direction from the sleeve axis; and wherein at least one tooth contact element extends from a head portion in the first direction.

8. The oral care device according to claim 1 wherein the first slot portion of the distal section has a substantially constant transverse cross-sectional area and terminates at an upper surface.

9. The oral care device according to claim 1 wherein the outer surface of the body portion has a channel extending substantially parallel to the sleeve axis, the channel filled with an elastomeric material.

10. The oral care device according to claim 1 wherein the first, second, and third slot portions are circumferentially arranged about the central portion of the distal section of the internal cavity in an equally spaced manner.

11. The oral care device according to claim 1 wherein the first slot portion radially extends in a first direction from the sleeve axis, at least one tooth contact element extends from a head portion in the first direction, and a channel formed on the outer surface of the body portion extends in a second direction opposite the first direction.

12. An oral care implement comprising:
    the oral care refill head according to claim 1; and
    an oral care implement handle comprising a gripping portion and a stem comprising an attachment portion protruding from the gripping portion, wherein the oral care refill head is coupled to the oral care implement handle with the attachment portion of the stem located within the internal cavity of the oral care refill head.

13. The oral care implement according to claim 12 wherein the attachment portion of the stem comprises a post terminating in a closed distal end that forms a free end of the attachment portion of the stem, the closed distal end of the post having a non-circular transverse profile.

14. The oral care implement according to claim 13 wherein the post comprises a hub portion that nests within the central portion of the internal cavity and at least one protuberance extending radially from the hub portion, each protuberance nesting within one of the slot portions of the internal cavity.

15. An oral care implement comprising:
    a handle comprising:
        a gripping portion extending from a proximal end to a distal end, the distal end of the gripping portion forming a first transverse shoulder;
        a stem extending along a stem axis and comprising an attachment portion protruding from the first transverse shoulder, the attachment portion comprising:

a second transverse shoulder axially spaced from the first transverse shoulder;

a post protruding from the second transverse shoulder, the post terminating in a closed distal end that forms a free end of the attachment portion of the stem, the post comprising a hub portion extending along the stem axis and at least one protuberance protruding either: (1) radially from a side surface of the hub portion; and/or (2) upward from the second transverse shoulder, the at least one protuberance terminating in a side terminal surface; and a vibration generating device;

a refill head comprising a sleeve portion extending from a proximal end to a distal end, the sleeve portion comprising an inner surface that defines an internal cavity and a channel formed on an outer surface of the sleeve portion;

wherein the refill head is detachably coupled to the stem of the handle such that the attachment portion of the handle is located within the internal cavity of the sleeve portion of the refill head and the side terminal surface of the at least one protuberance is in surface contact with the inner surface of the sleeve portion; and wherein the at least one protuberance radially extends in a first direction and the channel radially extends in a second direction opposite the first direction, the channel filled with an elastomeric material.

16. The oral care implement according to claim 15 further comprising a plurality of the protuberances circumferentially arranged about the hub portion in a spaced-apart manner so that portions of the side surface of the hub portion located between adjacent ones of the protuberances remain exposed.

17. The oral care implement according to claim 16 wherein the portions of the side surface of the hub portion located between adjacent ones of the protuberances are spaced apart from the inner surface of the sleeve portion of the refill head.

18. The oral care implement according to claim 15 further comprising:

the refill head further comprising:
the internal cavity extending along a sleeve axis from an open bottom end at the proximal end of the sleeve portion to a closed top end;
the internal cavity comprising a proximal section adjacent the open bottom end and a distal section adjacent the closed top end; and
wherein the post of the attachment portion of the stem of the handle is located within the distal section of the internal cavity of the sleeve portion of the refill head.

19. The oral care implement according to claim 18 wherein the distal section of the internal cavity comprises a central portion located on the sleeve axis and at least one slot portion radially extending from the central portion, wherein the hub portion of the post is located within the central portion of the internal cavity and the at least one protuberance of the post is located within the at least one slot portion of the internal cavity; and wherein the side surface of the hub portion and the side terminal surface of the at least one protuberance are in surface contact with the inner surface of the sleeve portion of the refill head.

* * * * *